United States Patent
Hebron et al.

(10) Patent No.: US 11,652,659 B2
(45) Date of Patent: *May 16, 2023

(54) METHOD AND APPARATUS FOR PROVIDING A HIGH SECURITY MODE IN A NETWORK

(71) Applicant: Entropic Communications, LLC, New York, NY (US)

(72) Inventors: Yoav Hebron, San Diego, CA (US); Na Chen, San Diego, CA (US); Ronald Lee, San Diego, CA (US)

(73) Assignee: Entropic Communications, LLC, New York, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/212,791

(22) Filed: Mar. 25, 2021

(65) Prior Publication Data

US 2021/0409241 A1  Dec. 30, 2021

Related U.S. Application Data

(63) Continuation of application No. 17/000,773, filed on Aug. 24, 2020, now abandoned, which is a continuation of application No. 16/717,248, filed on Dec. 17, 2019, now abandoned, which is a continuation of application No. 16/404,351, filed on May 6, 2019, now Pat. No. 10,756,923, which is a continuation of application No. 14/839,532, filed on Aug. 28, 2015, now Pat. No. 10,284,386.

(60) Provisional application No. 62/043,403, filed on Aug. 28, 2014.

(51) Int. Cl.
| | |
|---|---|
| H04L 12/28 | (2006.01) |
| H04L 41/28 | (2022.01) |
| H04L 9/40 | (2022.01) |
| H04L 41/12 | (2022.01) |

(52) U.S. Cl.
CPC .......... *H04L 12/2838* (2013.01); *H04L 41/12* (2013.01); *H04L 41/28* (2013.01); *H04L 63/20* (2013.01); *H04L 2012/284* (2013.01); *H04L 2012/2849* (2013.01)

(58) Field of Classification Search
CPC ..... H04L 9/0819; H04L 67/53; H04L 67/535; H04L 9/088; H04L 9/0894; G06F 21/62; G06Q 20/1235
See application file for complete search history.

(56) References Cited

U.S. PATENT DOCUMENTS

| | | | | |
|---|---|---|---|---|
| 2004/0267876 | A1* | 12/2004 | Kakivaya | H04L 69/329 709/200 |
| 2007/0141988 | A1* | 6/2007 | Kuehnel | H04W 8/005 358/1.15 |
| 2007/0286136 | A1* | 12/2007 | Rittle | H04W 8/005 370/338 |
| 2011/0173435 | A1* | 7/2011 | Liu | H04L 9/3226 713/150 |

(Continued)

*Primary Examiner* — Shanto Abedin
(74) *Attorney, Agent, or Firm* — McAndrews Held & Malloy, Ltd.

(57) ABSTRACT

Systems and methods systems and methods for efficiently and securely forming a communication network. As a non-limiting example, various aspects of the present disclosure provide systems and methods, for example utilizing a plurality of different security modes, for forming a premises-based network (e.g., a MoCA network).

14 Claims, 8 Drawing Sheets

(56) References Cited

U.S. PATENT DOCUMENTS

| | | | | |
|---|---|---|---|---|
| 2011/0310770 | A1* | 12/2011 | Liang | H04W 84/18 370/254 |
| 2014/0010223 | A1* | 1/2014 | Wang | H04W 76/11 370/338 |
| 2014/0056220 | A1* | 2/2014 | Poitau | H04W 40/246 370/328 |

* cited by examiner

METHOD AND APPARATUS FOR PROVIDING A HIGH SECURITY MODE IN A NETWORK

CROSS-REFERENCE TO RELATED APPLICATIONS/INCORPORATION BY REFERENCE

This patent application is a continuation of U.S. patent application Ser. No. 17/000,773, filed Aug. 24, 2020, and titled "Method and Apparatus for Providing a High Security Mode in a Network"; which is a continuation of U.S. patent application Ser. No. 16/717,248, filed Dec. 17, 2019, and titled "Method and Apparatus for Providing a High Security Mode in a Network"; which is a continuation of U.S. patent application Ser. No. 16/404,351, filed May 6, 2019, and titled "Method and Apparatus for Providing a High Security Mode in a Network," now U.S. Pat. No. 10,756,923; which is a continuation of U.S. patent application Ser. No. 14/839,532, filed Aug. 28, 2015, and titled "Method and Apparatus for Providing a High Security Mode in a Network," now U.S. Pat. No. 10,284,386; which makes reference to, claims priority to, and claims benefit from U.S. Provisional Patent Application Ser. No. 62/043,403, filed on Aug. 28, 2014, and titled "Method and Apparatus for Providing a High Security Mode in a MoCA 2.0 Network;" the entire contents of each of which are hereby incorporated herein by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Various communication networks, such as for example legacy MoCA networks, lack a method and/or apparatus for efficiently adding a new node to the network while maintaining the security thereof. Limitations and disadvantages of conventional methods and systems for handling the addition of a new node to a network, for example a MoCA network, will become apparent to one of skill in the art, through comparison of such approaches with some aspects of the present methods and systems set forth in the remainder of this disclosure with reference to the drawings.

SUMMARY

Figure 1:
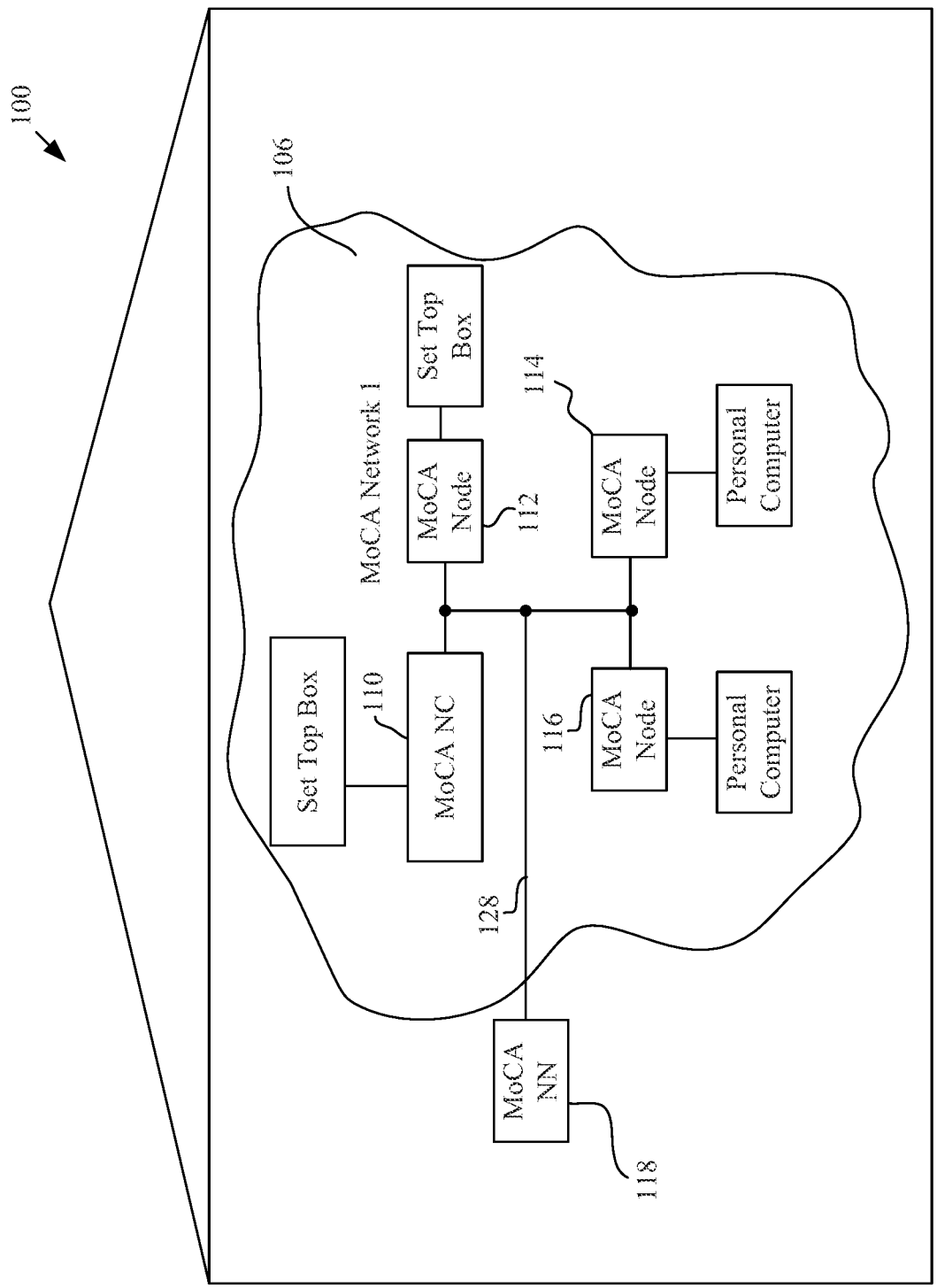
FIG. 1 is a simplified illustration of an example home comprising a MoCA network and nodes.

Various aspects of this disclosure provide systems and methods for efficiently and securely forming a communication network. As a non-limiting example, various aspects of the present disclosure provide systems and methods, for example utilizing a plurality of different security modes, for forming a premises-based network (e.g., a MoCA network).

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

A premises (e.g., a home, office, campus, etc.) may comprise a communication network for the sharing of information between various devices within the premises. For example, entertainment content may be received through a wide area network (WAN) provided by an MSO (Multi-system Operator), such as a cable television operator or satellite content provider. Content provided to the premises may be distributed throughout the premises over a premises-based network (e.g., a home entertainment network, general premises-based communication network, etc.). The premises-based network may, for example, comprise a local area network (LAN) in any of a variety of configurations, such as a mesh network. An example protocol for establishing a premises-based network, for example a home entertainment LAN, is defined by the well-known MoCA (Multi-media over Coax Alliance) network protocol that is in-use today.

FIG. 1 is a simplified illustration of an example home 100 comprising a MoCA network 106 and nodes 110, 112, 114, and 116. Though only four nodes are illustrated it should be understood that the network 106 may comprise any number of nodes. The nodes of the network 106 are coupled to a coaxial cable medium 128. In the example network 106, the signals present on the coaxial cables of the network 106 are available to each of the nodes 110, 112, 114, and 116. Though much of the discussion herein presents examples of various aspects of the disclosure in the context of a MoCA network, it would be understood that the scope of this disclosure is not limited to a MoCA network nor by various characteristics of a MoCA network.

The example network 106, for example a MoCA network, may be formed by each node, upon connecting to the medium 128, searching for another node to determine whether a network already exists. A New Node (NN) 118 searches by attempting to detect the transmission of a Beacon message. A Beacon message may, for example, comprise an unencrypted transmission sent by a node 110 operating as Network Coordinator (NC) (or network controller). The NC 110 may, for example, be responsible for scheduling all of the activity on the network 106 over the coaxial medium 128. All activity on the network may, for example, be scheduled by the NC 110 transmitting a Media Access Plan (MAP) message. In one example implementation, there is always one, and only one, NC 110 on the network 106 at a time. In an example implementation, any node of the network 106 (e.g., a MoCA network) can assume responsibility for functioning as the NC. If there is no other network yet formed on the medium 128, the node 110 will take on the responsibility for functioning as the NC and admit other nodes to form a network.

As other nodes are installed, they will each detect the Beacons being transmitted by this node acting as the NC 110. When an NN 118 detects the Beacons, the NN 118 will go through an admission process whereby the NN 118 will gain admission to the network 106 established by the NC 110. At times, if the NC 110 ceases functioning correctly, hands off NC responsibility, or is removed from the network, responsibility for performing the functions of the NC will be taken up by another node (e.g., node 112) in the network 106.

In many instances, it is important to ensure that the network 106 remains secure. Content that is passed over the network 106 may be private and proprietary. For example, it may (e.g., at times, or always) be important to ensure that only authorized nodes are admitted to the network 106. In accordance with various legacy communication network protocols (e.g., MoCA 2.0, etc.), a security scheme is provided to ensure the security of the network. In one example implementation, a newly admitted node must generate security keys using an AESKeyGen (Advanced Encryption Standard key generation function). The generated security keys allow the node to communicate over the network 106. AES security (e.g., as utilized in MoCA 2.0, among other communication standards) is considered to be relatively strong. However, to maintain backward compatibility with earlier generation networks (or components thereof), a new generation network may allow earlier generation nodes to join the network, even if such nodes do not operating in accordance with the preferred security functions. For example, MoCA 2.0 allows MoCA 1.0 and MoCA 1.1 nodes to join using only DES (Data Encryption Standard), and DES is relatively unsecure compared to AES. In such systems, a current generation network may be vulnerable to attack by earlier generation nodes operating in the current generation network. For example, a MoCA 2.0 network may, for example, become vulnerable to attack through the MoCA 1.0 and MoCA 1.1 nodes operating in accordance with DES.

Accordingly, various aspects of the present disclosure provide systems, methods, and/or protocols for current generation nodes to securely form a network, for example in the presence of earlier generation nodes.

The currently disclosed methods, apparatus, and/or protocols provide a HIGH SECURITY mode that may be used in the context of a communication network (e.g., a premises-based network, a MoCA network, etc.) to ensure that only authorized nodes can join the network and to reduce the vulnerability of the network (e.g., the network password, authentication method, encryption method, etc.) to attacks. In accordance with one example implementation, when HIGH SECURITY mode is enabled, a high security password of up to 64 printable ASCII characters is used to increase the security of the network. In addition, nodes that have HIGH SECURITY mode capability (or have such capability enabled) may, for example, only join networks that have HIGH SECURITY mode capability (or are presently operating in accordance with such mode). Furthermore, networks that have HIGH SECURITY mode capability (or are presently operating in accordance with such mode) might, for example, only allow nodes that have HIGH SECURITY mode capability to join.

In accordance with various aspects of the present disclosure, a new HIGH_SECURITY field is provided in a network Discovery Request message (e.g., a Discovery Request Network Information Element (IE) of a Discovery Request message, etc.) to indicate whether a node is operating in HIGH SECURITY mode. In an example implementation, a previously reserved (or non-utilized) field of the Discovery Request message (or information element) may be utilized. In such manner, the field may already comprise a known default value utilized by legacy nodes that are not aware of the utilization of such field by newer generation nodes. For example, the value of the previously reserved field may typically be set to zero for legacy nodes that do not have HIGH SECURITY mode capability. During an admission procedure, a New Node (NN) that is seeking admission to a network may indicate whether the NN has HIGH SECURITY mode enabled by setting the value of the HIGH_SECURITY field to a predetermined value.

In accordance with various aspects of the present disclosure, a new HIGH_SECURITY field may also be provided in a network Discovery Response message (e.g., a Permanent Salt Network IE of a Discovery Response message, etc.) to indicate whether the HIGH SECURITY mode is enabled in the network. In an example implementation, such field may reflect whether the value of a new control parameter HIGH_SECURITY$_{EN}$ maintained by the Network Coordinator (NC) indicates that that the HIGH SECURITY mode is enabled. In such example implementation, the NC may transmit the Permanent Salt Network IE (e.g., as part of a Discovery Response message or other message) to an NN seeking admission to indicate whether the network has HIGH SECURITY mode capability and/or is operating in the HIGH SECURITY mode.

In accordance with various aspects of the present disclosure, a code is provided that indicates whether there is a mismatch in security mode. In an example MoCA network implementation, a new code may be added to the CODE field of the Pre-Admission Response Network IE. The new code may, for example, indicate that no admission request Admission Control Frame (ACF) has been scheduled due to a mismatch in the security mode (e.g., the HIGH_SECURITY field of the Discovery Request Network IE has a different value than the HIGH_SECURITY field of the Permanent Salt Network IE (or the HIGH_SECURITY$_{EN}$)).

Figure 2:
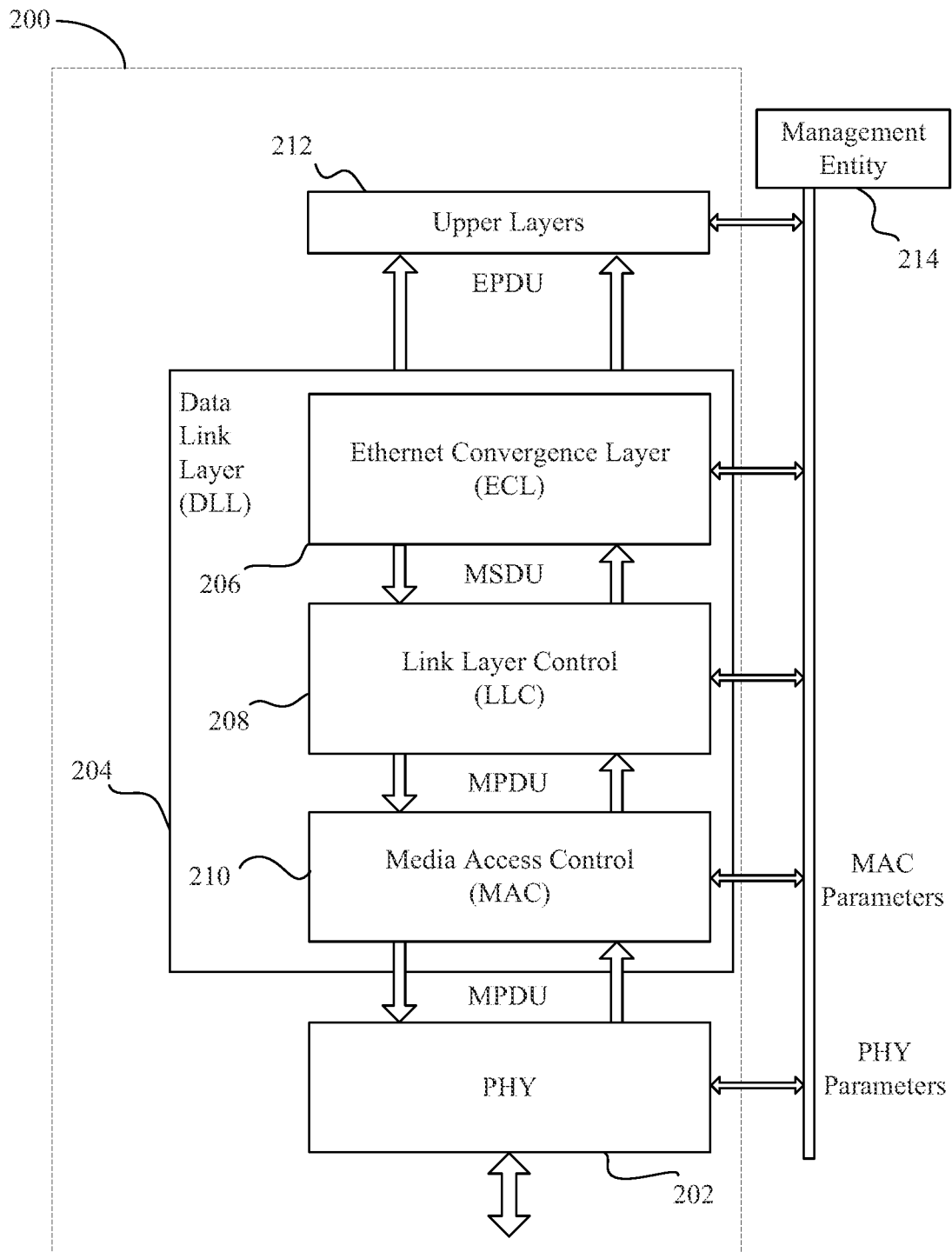
FIG. 2 is a logical block diagram of a network node, in accordance with various aspects of the present disclosure.

FIG. 2 is a logical block diagram of a network node 200 in accordance with various aspects of the present disclosure. The network node 200 may, for example, be operable to perform any or all of the node functionality discussed herein (e.g., for a new node 118, network coordinator node 110, existing node 112, 114, and 116, any or all of the nodes discussed herein, etc.). In general, each node discussed herein may be functioning in a manner that is appropriate to the role such node is currently performing. For example, in the scenario illustrated in FIG. 1 and discussed herein, the NC node 110 performs the role of the network NC, the node 118 plays the role of an NN that has not yet been admitted to the network 106, the Existing Nodes (EN) 112, 114, and 116 play the role of a node that has been admitted to the network 106, for example by the NC 110, etc. Various functions of the network nodes are disclosed herein in order to understand how each node functions in its role in accordance with various aspects of the present disclosure.

The example node 200 uses the seven layer Open System Interconnection (OSI) model and/or any generally analogous layered communication model. For example, the node 200 may comprise circuitry that operates to implement a physical layer 202 which is responsible for controlling the physical interface to the medium (e.g., cable medium, phone line medium, other wired medium, wireless medium, tethered and/or untethered optical medium, etc.), including transmitting and/or receiving signals over the medium.

The node 200 may comprise circuitry that operates to implement a Data Link Layer (DLL) 204, for example comprising several sub-layers (e.g., an Ethernet Convergence Layer (ECL) 206, Link Layer Control (LLC) 208, Media Access Control (MAC) 210, etc.). The DLL 204 may, for example, be responsible for controlling the higher layer operation above the physical layer 202 and determining the timing and management of messages to be transmitted and received. Accordingly, the DLL 204 may work with the physical layer 202 to perform any or all of the functions discussed herein (e.g., with regard to FIGS. 1-7). In one example implementation, the DLL 204 is implemented by the execution of software running on at least one processor. The DLL 204 and/or any of the layers shown in FIG. 2 may be implemented by any of a variety of types of processing circuitry (e.g., application-specific integrated circuitry, programmable array logic circuitry, discrete logic circuitry, general-purpose processor circuitry, specific-purpose processing circuitry, etc.).

In accordance with various aspects of the present disclosure, a Management Entity (ME) 214 may, for example, comprise a high layer logical device associated with the node 200. The ME 214 may, for example, provide high level control of the node 200, provide content to the node 200 for transmission over the network, receive content from the node 200 received from the network, etc. The ME 214 or portions thereof may, for example, be collocated with the node 200 and/or may be implemented at a location that is geographically remote from the node 200. Similarly, the Upper Layers 212 may be collocated with the node 200 and/or may be implemented at a location that is geographically remote from the node 200.

In accordance with various aspects of the present disclosure, several control parameters may be utilized to pass information between the node 200 and the management entity 214. In accordance with one example implementation, three example control parameters are disclosed herein for use in a network (e.g., a MoCA network, etc.), in addition to several other existing control parameters. These three example control parameters are shown in Table 1 below.

TABLE 1

| Control Parameters | | |
| --- | --- | --- |
| Parameters Name | Description | Allowed Values |
| HIGH_SECURITY$_{EN}$ | Controls whether the Node operates in HIGH SECURITY mode or not when privacy is enabled. | ENABLED, DISABLED |
| SEC_MODE_MISMATCH$_{DETECT}$ | When the Node is the NC, reports that a Node with a different security mode tried to join the network. When the Node is an NN, reports that it detected a network that is in a different security mode. | Active, Inactive |

TABLE 1-continued

Control Parameters

| Parameters Name | Description | Allowed Values |
| --- | --- | --- |
| PSWD | Value of the Password used by the Node | When $\text{HIGH\_SECURITY}_{EN}$ = DISABLED: A password of between 12 and 17 decimal digits; When $\text{HIGH\_SECURITY}_{EN}$ = ENABLED: Any string of up to 64 Printable ASCII Characters |

These control parameters, for example, allow and/or support information to be passed between a management entity 214 that is responsible for high level control of a network node 200 and the node 200 itself. The first example control parameter, $\text{HIGH\_SECURITY}_{EN}$, may for example be used to provide a mechanism to allow the management entity 214 to control whether the node 200 operates (or must operate) in HIGH SECURITY mode.

The second example control parameter, $\text{SEC\_MODE\_MISMATCH}_{DETECT}$, indicates whether the node 200 has detected a mismatch in the security capability (and/or enablement) of the node 200 and other nodes with which the node 200 might network. For example, if the node 200 is a new node (NN), then $\text{SEC\_MODE\_MISMATCH}_{DETECT}$ may indicate whether there is a mismatch between the security capability (or present security mode) of the NN 200 and the Network Coordinator (NC) of a network that the NN 200 is attempting to join. The example control parameter $\text{SEC\_MODE\_MISMATCH}_{DETECT}$ may, for example, be reported to (or read by) the management entity 214 by the node 200. If the node 200 is an NC, then the example control parameter $\text{SEC\_MODE\_MISMATCH}_{DETECT}$ may indicate whether there is a mismatch between the security capability (or present security mode) of the NC 200 and a NN that is attempting to join the network. Illustrative examples of the operation of a NN in HIGH SECURITY mode and the operation of an NC in HIGH SECURITY mode are provided herein.

The third example control parameter, PSWD, may for example provide a way for the management entity 214 to control the value of the current active password of the node 200.

Figure 3:
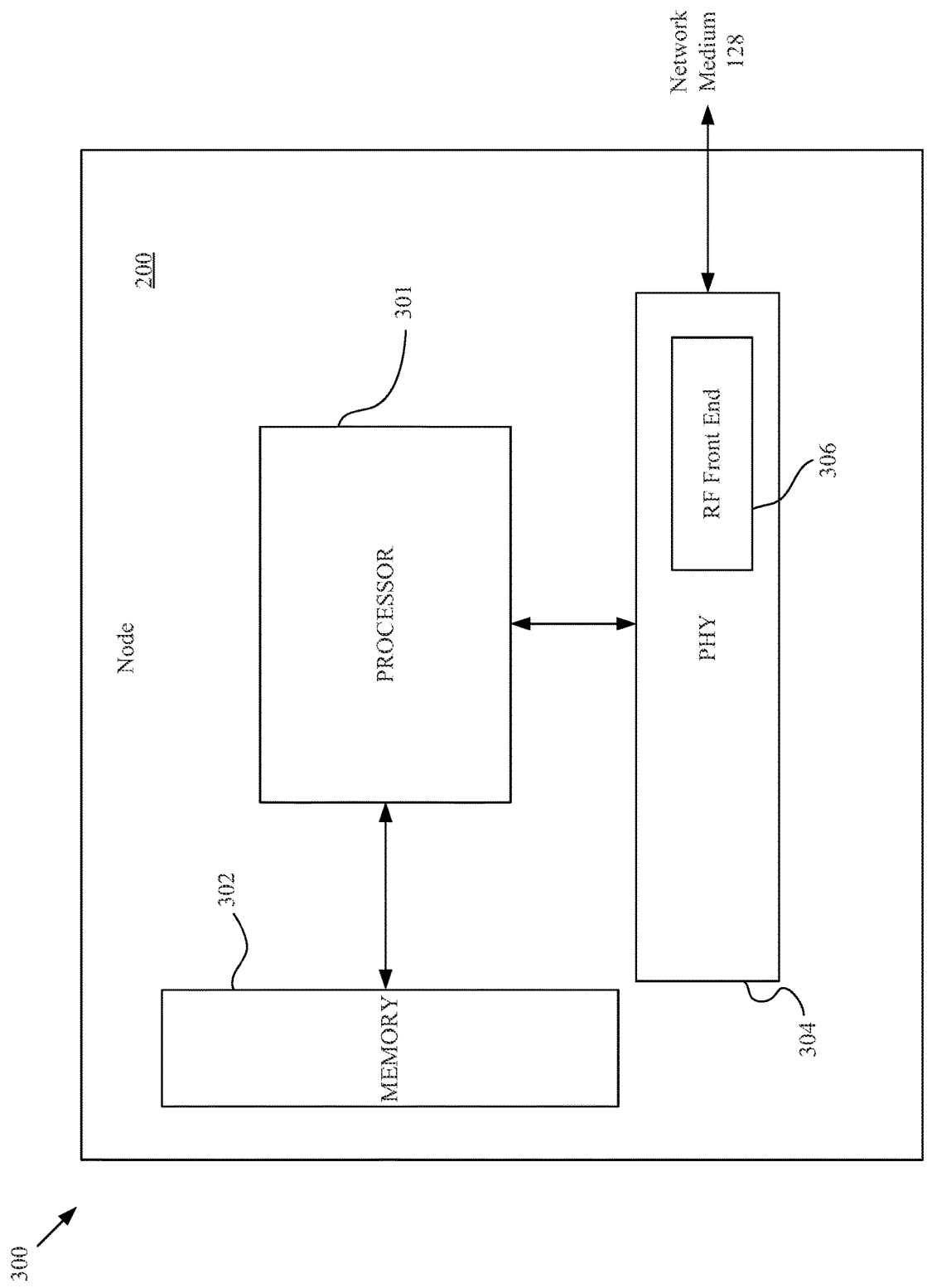
FIG. 3 is a simplified block diagram of example circuitry used to implement a network node, in accordance with various aspects of the present disclosure

FIG. 3 is a simplified block diagram of example circuitry used to implement a network node 300, in accordance with various aspects of the present disclosure. The network node 300 may, for example, be operable to perform any or all of the node functionality discussed herein (e.g., with regard to FIGS. 1-7). The network node 300 may, for example, share any or all characteristics with any of the nodes discussed herein (e.g., the node 200 of FIG. 2, the nodes 110, 112, 114, 116, and 118 of FIG. 1, etc.).

The node 300 comprises at least one processor 301, a memory 302, and a PHY 304. The memory 302 is coupled to the processor 301. The PHY 304 includes an RF front end 306. The PHY 304 may also include a dedicated processor (not shown) that performs functions associated with the PHY 304. Alternatively, some control functions of the PHY 304 may be performed by the processor 301. In the transmit path, the PHY 304 and/or RF Front End 306 may receive information from the processor 301. The information is modulated on signals generated by the RF front end 306. The RF front end 306 transmits such signals over a medium 128 (e.g., over coaxial cabling used to connect notes of a MoCA network, etc.). In the receive path, the PHY 304 and/or RF front end 306 receive signals from the medium 128, demodulates the signals to retrieve the information communicated by such signals, and passes the received information to the processor 301 for processing. It should be understood that, while the example node 300 shown in FIG. 3 (and other nodes discussed herein) is described with respect to a node connected to a network via coaxial cable, the node 300 may be connected to the network over any medium.

The processor 301 within the node 300 performs several tasks. The example node 300 is shown and described as having a single processor 301 that performs all of the disclosed tasks and functions of the node 300. Nonetheless, it should be understood that the disclosed tasks and functions of the node 300 may be performed by any combination of hardware, firmware, and software. Furthermore, any software or firmware may be executed by one or a combination of several independent or coordinated processors. For example, in various example implementations, it may be more efficient to use processors dedicated to performing a particular task or group of tasks. Also for example, the processor 301 (or processors) may comprise any of a variety of processing circuits (e.g., general purpose processors, specific purposes processors, microcontrollers, application-specific integrated circuits, programmable state machine devices, analog and/or digital circuitry, etc.). In an alternative implementation, the node 300 may have several processors that work together or independently. The processor 301 may, for example, read computer readable program code from the memory 302 and execute the code to perform the functions of the DLL 204, the upper layers 212 and/or the ME 214 (see FIG. 2). In one example implementation, the ME 214 is not co-located with the DLL 204. In such an example implementation, the ME 214 may be implemented using a different processor or processors. Likewise, in one example implementation, the upper layers 212 are not co-located with the DLL 204. In such an example implementation, the upper layers 212 may be implemented using a different processor or processors. It should be understood that the particular physical layout of the logical components may vary substantially, so long as the disclosed functionality may be performed. In an alternative implementation, the functions of the DLL 204 and/or other functions disclosed herein may be performed by dedicated hardware, firmware or a combination of hardware, firmware and software executed by a special or general purpose processor.

Figure 4:
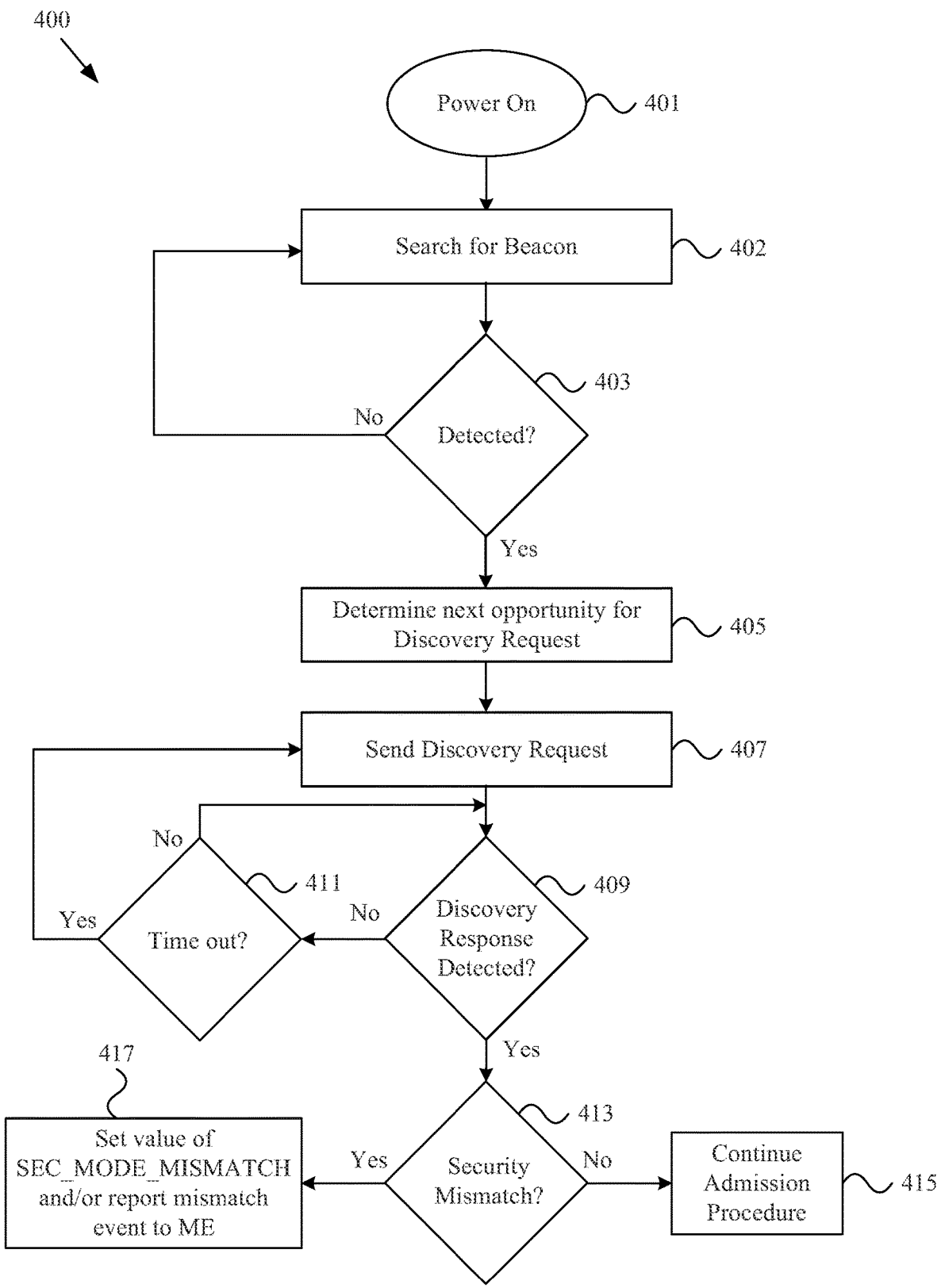
FIG. 4 is a flow diagram of an example method for operating a network node, for example a new network node, in accordance with various aspects of the present disclosure.

FIG. 4 is a flow diagram of an example method 400 for operating a network node, for example a new network node, in accordance with various aspects of the present disclosure.

The example method 400 may, for example, be performed by any or all network nodes presented herein (e.g., the node 300 of FIG. 3, the node 200 of FIG. 2, the nodes 110, 112, 114, 116, and 118 of FIG. 1, etc.). For example, the example method 400 may be followed by a new node (NN) looking to gain admission to (or attach to) a communication network. The discussion herein will proceed referring to the operation of new node 118, shown in FIG. 1 (e.g., which may also be shown as the nodes 200 and 300 shown in FIGS. 3 and 4). The NN 118 may, for example, be operating in a HIGH SECURITY mode, in accordance with various aspects of the present disclosure. It should be understood, however, that the scope of the various aspects of the present disclosure is not limited to operation of a new node.

The example method 400 begins executing at block 401 in response to a power-on condition of the new node 118. It should be understood, however, that the example method 400 may begin executing in response to any of a variety of causes or conditions. For example, the example method 400 may begin executing in response to a hard reset of the new node 118, in response to a user request or command received at the new node 118, in response to a request or command from another node (e.g., a network coordinator node or other node), in response to execution of a related flow diagram, etc.

At block 402, the new node 118 searches for a Beacon message. For example, the new node 118 may search the signals that are being transmitted over the coaxial cable 128 to which the new node 118 is connected to identify a Beacon message (or Beacon). As explained herein, the coaxial cable might comprise only signals associated with a single network, but may also comprise signals associated with a plurality of networks (e.g., a plurality of home-based cable networks).

At flow control block 403, if a Beacon is not detected, then execution flow of the example method 400 may return to block 402 for continued searching. If, however, a Beacon is detected, then execution flow of the example method 400 may proceed to block 405. Beacons may, for example, be generated by one or more network coordinators.

At block 405, for example after the new node 118 detects a Beacon, the new node 118 may determine from information carried by the Beacon when the next Admission Control Frame (ACF) slot will occur and/or when the next ACF slot that is designated for communication of a Discovery Request message will occur. The ACF slot may, for example, be designated for the communication of any of a variety of types of admission control messages. Also for example, the ACF slot may be designated specifically for transmission of a Discovery Request message.

For example, if there is a network 106 that is currently operating on the medium to which the new node 118 is connected, the NC 110 of that network may send out periodic Beacons. These Beacons may, for example, indicate times when a new node can send messages related to admission to the network. Such requests may, for example, include requests for the NC 110 to provide information regarding the network, to schedule an admission request time slot, etc. In accordance with one example implementation, when the control parameter HIGH_SECURITY$_{EN}$ is set to DISABLE within an NC 110, the NC 110 will alternately transmit a Beacon that schedules a MoCA 1.X (e.g., MoCA 1.0, MoCA 1.1, etc.) Admission Request time slot and a Beacon that schedules a MoCA 2.X (e.g., a MoCA 2.0, etc.) Discovery Request time slot. In one example implementation, when operating in HIGH SECURITY mode, the NC 110 will only transmit Beacons that schedule ACF slots for MoCA 2.0 Discovery Request messages. In such example implementation, the NC 110 will not schedule any opportunities for a MoCA 1.X node to request admission to a network when operating in MoCA 2.0 HIGH SECURITY mode.

At block 407, the new node 228 may (e.g., at the next opportunity to send a Discovery Request message), transmit a Discovery Request message. In accordance with various aspects of this disclosure, the Discovery Request message may for example carry a Discovery Request Network IE (Information Element). A non-limiting example of the Discovery Request message is shown in FIG. 5.

Figure 5:
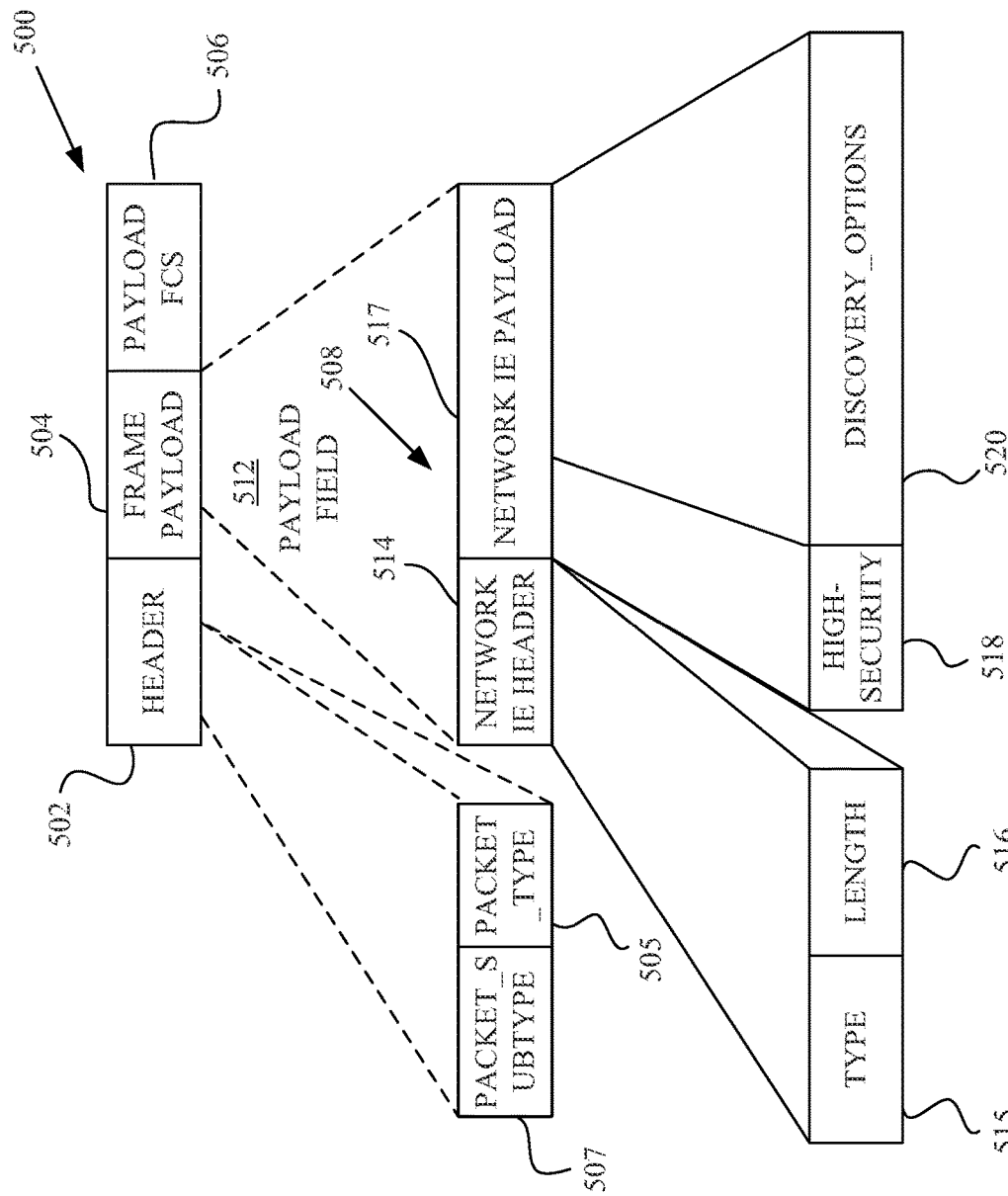
FIG. 5 is an illustration of a format of an example Discovery Request message, in accordance with various aspects of the present disclosure.

FIG. 5 is an illustration of a format of an example Discovery Request message, in accordance with various aspects of the present disclosure. Table 2 also illustrates an example format for a Discovery Request and/or a Discovery Response message.

TABLE 2

Discovery Request and Discovery Response Message Formats

| Field | Length | Usage |
|---|---|---|
| MPDU Header 502 | | |
| TRANSMIT_CLOCK | 32 bits | This value is the scheduled time derived from the corresponding Allocation Unit in the MAP. |
| PACKET_SUBTYPE | 4 bits | 0x0 - Pre-admission discovery request<br>0x1 - Pre-admission discovery response |
| PACKET_TYPE | 4 bits | 0x9 - Link control II |
| VERSION | 8 bits | 0x10 |
| RESERVED | 8 bits | This field is reserved for future use. |
| SOURCE_NODE_ID | 8 bits | The NC node ID when sent by the NC. 0x00 otherwise |
| RESERVED | 8 bits | This field is reserved for future use. |
| DESTINATION_NODE_ID | 8 bits | 0x3F - Broadcast |
| PACKET_LENGTH | 16 bits | The length of the packet |
| MPDU_CONTROL_INFORMATION | 32 bits | Various information bits related to the Ethernet unicast/broadcast packet types |
| HEADER_FCS | 16 bits | Header for the Frame Check Sequence |
| Frame Payload 504 | | |
| RESERVED | 32 bits | Type III |
| Payload | Variable | List of Network IEs |

TABLE 2-continued

Discovery Request and Discovery Response Message Formats

| Field | Length | Usage |
|---|---|---|
| | | Payload FCS 506 |
| PAYLOAD_FCS | 32 bits | Frame Check Sequence |

The example Discovery Request message 500 comprises a header 502, frame payload 504, and payload FCS (Frame Check Sequence) 506. The header 502 may, for example, comprise several fields, non-limiting examples of which are provided herein. One of the fields may, for example, comprise a PACKET_TYPE field 505. The PACKET_TYPE field 505 may, for example, be set to a value to indicate that the communication is a Link Control II message. Another of the fields in the header 502 may, for example, comprise a PACKET_SUBTYPE field 507. The value of the PACKET_SUBTYPE field 507 may, for example, be set to a value to indicate that the Discovery Request message 500 is a Pre-Admission Discover Request message. The frame payload 504 may, for example, comprise a PAYLOAD field 512. The PAYLOAD field 512 may, for example, be loaded with a Discovery Request Network IE 508. Table 3 shows an example format of the Discovery Request Network IE 508.

TABLE 3

Discovery Request Network IE

| Field | Length | Value |
|---|---|---|
| | | Network IE Header - 514 |
| TYPE | 8 bits | 0x00 - Discovery Request Network IE |
| LENGTH | 8 bits | 0x00 |
| | | Network IE Payload - 517 |
| RESERVED | 11 bits | Type III |
| HIGH_SECURITY | 1 bit | When PRIVACY$_{EN}$ = ENABLED: reflects the value of HIGH_SECURITY$_{EN}$<br>0b0 - Disabled<br>0b1 - Enabled<br>When PRIVACY$_{EN}$ = DISABLED: set to 0b0 |
| DISCOVERY_OPTIONS | 4 bits | 0x0 - Discover all MoCA Network attributes defined in Standard<br>0x1 - Discover all MoCA Network attributes defined in Standard, and request a MoCA 2.0 Admission Request time slot<br>0x2 - Skip Discovery Response and request a MoCA 2.0 Admission Request time slot directly.<br>Other values reserved |

The Discovery Request Network IE 508, in turn, may comprise a Network IE Header 514 and a Network IE Payload 517. The Network IE Header 514 may, for example, comprise a TYPE field 515 and a LENGTH field 516. The TYPE field 515 may, for example, be set to a value to indicate that the payload 504 of the Discovery Request message 500 is a Discovery Request Network IE. The LENGTH field 516 may, for example, indicate the length of the Discovery Request Network IE 508.

In accordance with one example implementation, the Network IE Payload 517 may comprise three example fields. The first example field may, for example, be reserved for future use (shown in Table 3, but not shown in FIG. 5). The second example field is a HIGH_SECURITY field 518. The third example field is a DISCOVERY_OPTIONS field 520.

In accordance with an example scenario, the value of the HIGH_SECURITY field 518 is set to M0 (binary value of zero) to indicate that either "Privacy" is disabled (e.g., as indicated by the value held in a control parameter PRIVACY$_{EN}$) or HIGH SECURITY mode is disabled (e.g., as indicated by the control parameter HIGH_SECURITY$_{EN}$ within the NN 118 being set to "DISABLED").

Alternatively, if Privacy is enabled (e.g., as indicated by the value held in the control parameter PRIVACY$_{EN}$) and HIGH SECURITY mode is enabled (e.g., as indicated by the control parameter HIGH_SECURITY$_{EN}$ within the NN 118 being set to "ENABLED"), then the value of the HIGH_SECURITY field 518 may be set to 0b1 (binary value of 1).

In an example scenario, if the NN 118 will require a relatively long time to generate the security keys needed to gain admission, then the NN 118 will set the DISCOVERY OPTIONS field 520 to 0x0 (hexadecimal value of zero) and set the HIGH_SECURITY field 518 to 0b1. The NN 118 will then transmit the Discovery Request message. When the security keys are ready, the NN 118 will transmit another Discovery Request message with the DISCOVERY_OPTIONS field 520 set to 0x1 or 0x2 and the HIGH SECURITY field 518 set to 0b1.

After the NN 118 transmits the Discovery Request message(s) at block 407, the NN 118 waits for a Discovery Response message. For example, execution flow of the example method 400 loops between flow control blocks 409 and 411 until either a Discovery Response message is received, at which point execution flow of the example method 400 proceeds to block 413, or a timer expires, at which point execution flow of the example method 400 returns to block 407.

In an example implementation, after sending the Discovery Request message at block 407, the NN 118 will listen for a Beacon that indicates when the NC 110 will send a responsive Discovery Response message (e.g., in an admission control frame (ACF) transmission). The NN 118 may, for example, monitor the network 106 until either detecting (or receiving) a Discovery Response message (at block 409) or timing out (at block 411). The NN 118 will then analyze the received Discovery Response message at block 413.

Figure 6:
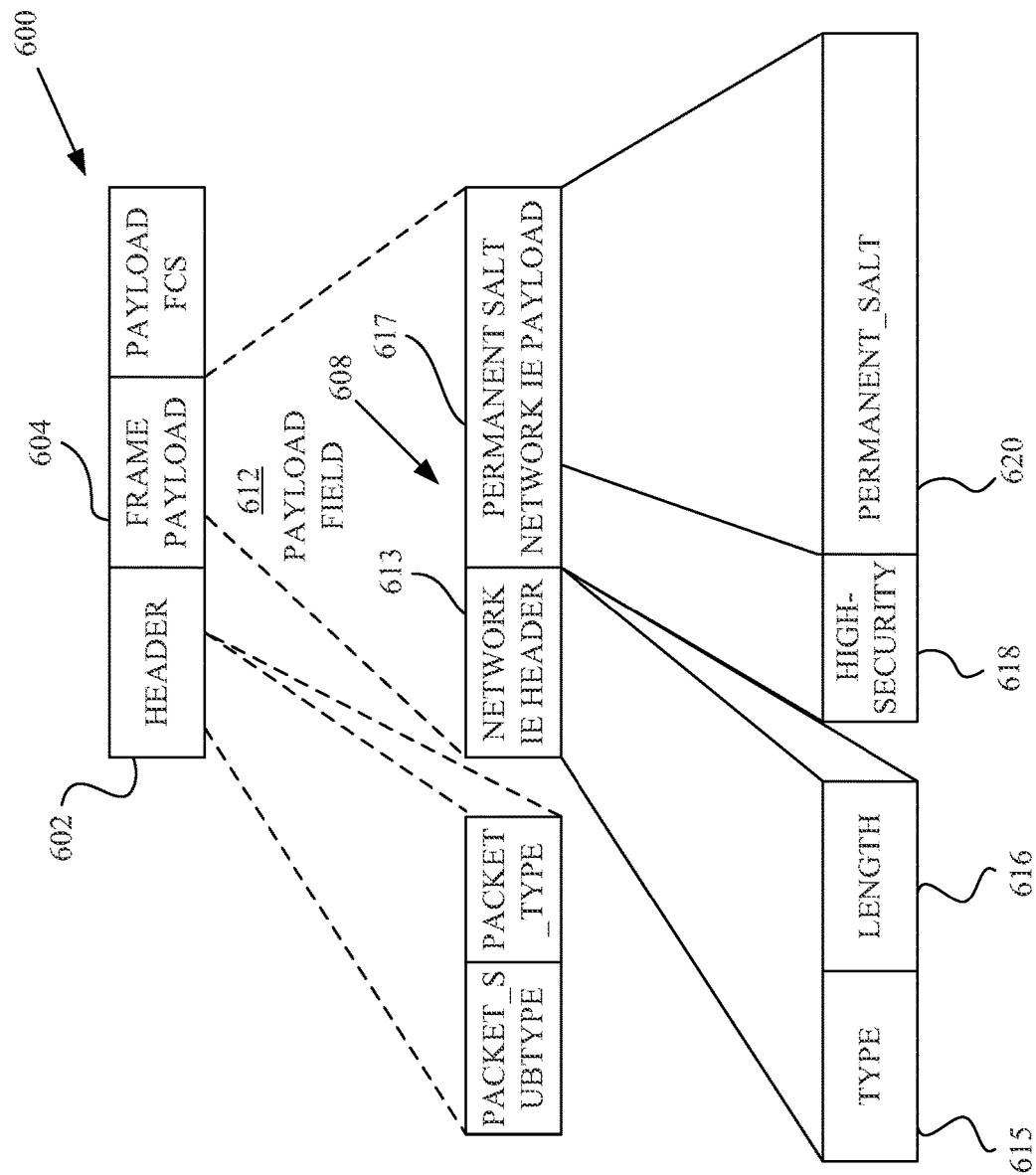
FIG. 6 is an illustration of a format of an example Discovery Response message, in accordance with various aspects of the present disclosure.

The Discovery Response message may, for example, be formatted in accordance with Table 2 shown herein. FIG. 6 also illustrates the format of an example Discovery Response message 600. The format of the Discovery Response message 600 may, for example, be generally the same as the Discovery Request message 500.

In an example implementation, if privacy is enabled, the NC 110 will transmit a Discovery Response message 600 in which the frame payload 604 includes a Permanent Salt Network IE 608 in the PAYLOAD field 617 instead of the Discover Request Network IE 508 provided in the example Discovery Request message 500 discussed herein. However, if privacy is not enabled in the NC 110, then the NC 110 will send a Discovery Response message that does not include a Permanent Salt Network IE 608. Table 4 shows the format of an example Permanent Salt Network IE 608.

TABLE 4

Permanent Salt Network IE Format

| Field | Length | Value |
|---|---|---|
| Network IE Header - 613 | | |
| TYPE | 8 bits | 0x02- Permanent Salt Network IE |
| LENGTH | 8 bits | 0x03 |
| Permanent Salt Network IE Payload - 617 | | |
| RESERVED | 15 bits | Type III |
| HIGH_SECURITY | 1 bit | Reflects the value of the NC's HIGH_SECURITY$_{EN}$ 0b0 - Disabled 0b1 - Enabled |
| PERMANENT_SALT | 96 bits | Randomly generated |

The example Permanent Salt Network IE 608 comprises a Network IE Header 613 that includes a TYPE field 615 and a LENGTH field 616. In addition, the Permanent Salt Network IE 608 comprises a Permanent Salt Network IE Payload 617 comprising three fields. The first example field may, for example, be reserved for future use (shown in Table 4, but not shown in FIG. 6). The second example field is a HIGH_SECURITY field 618. The third example field is a PERMANENT_SALT field 620. The contents of the PERMANENT_SALT field 620 are used to create security keys.

Upon detecting a Discovery Response message at block 409, execution flow of the example method 400 proceeds to block 413. At block 413, the NN 118 determines whether the received Discovery Response includes a Permanent Salt Network IE 608. If the Discovery Response includes a Permanent Salt Network IE 608, the NN 118 determines whether the HIGH_SECURITY field 618 thereof is set to a value that does not match the value that was sent in the HIGH_SECURITY field 518 of the Discovery Request Network IE 508 sent by the NN 118 at block 407. If there is a security mismatch in the respective HIGH_SECURITY fields 518 and 618, then execution flow of the example method 400 will proceed to block 417 at which the NN 118 will set the value of the control parameter SEC_MODE_MISMATCH$_{DETECT}$ to indicate the security mismatch condition (e.g., in accordance with Table 1 herein). Note that setting the control parameter SEC_MODE_MISMATCH$_{DETECT}$ may, for example, cause an event message (e.g., a SEC_MODE_MISMATCH$_{DETECT}$ event) to be communicated to the NN's Management Entity to notify the Management Entity of the detected mismatch. Also for example, such an event message may be communicated to the ME without setting a local control parameter. Also, if at block 413, it is determined that the received Discovery Response message 600 does not include a Permanent Salt Network IE 608, and the NN 118 sent a Discovery Request message at block 407 in which the HIGH_SECURITY field 518 was set to 0b1 (e.g., a security mismatch exists), then execution flow of the example method 400 will proceed to block 417 at which the NN 118 will set the value of the control parameter SEC_MODE_MISMATCH$_{DETECT}$ to indicate the security mismatch condition (e.g., in accordance with Table 1 herein).

If at block 413, it is determined that there is no security mismatch, then execution flow of the example method 400 will proceed to block 415, at which the admission procedure for the NN 118 continues (e.g., using the HIGH SECURITY network password, for example as shown in Table 1).

Many networks (e.g., MoCA 2.0 networks, etc.) use passwords to ensure privacy. The password may, for example, be provided in any of a variety of manners, non-limiting examples are provided herein. For example, the password may be provided by an installation technician, the password may be programmed into the node prior to being delivered to the site of installation, etc.

In various networks (e.g., a MoCA 2.0 network, etc.), all of the nodes may share a same Network Password, for example when Network Privacy is enabled. Each node that wishes to join a network must have the correct password.

In an example implementation, when operating the HIGH SECURITY mode, the cryptographic algorithm used to provide privacy in the network may comprise AES-128, with a key length of 128-bits. The AES keys for node admission and link privacy may, for example, be derived from the Network Password. For example, all network nodes, including the NC 110, may derive a static AES key AMMK and APMKInitial from the Network Password and a Permanent Salt.

In an example implementation, when the control parameter HIGH_SECURITY$_{EN}$ is set to a value indicating that HIGH SECURITY mode is disabled, the Network Password length may be 12 to 17 decimal digits. When, however, the control parameter HIGH_SECURITY$_{EN}$ is set to a value indicating that HIGH SECURITY mode is enabled, a longer password of up to 64 printable ASCII characters may be used for the Network Password. In such an implementation, only nodes (e.g., MoCA nodes in a MoCA network) that have HIGH SECURITY mode capability will be able to support the longer password(s).

In addition, in accordance with various aspects of the present disclosure, the manner in which the keys are generated when the node is not operating in HIGH SECURITY mode (e.g., when the control parameter HIGH_SECURITY$_{EN}$ is set to DISABLED) may be different from the manner in which the keys are generated when the node is operating in HIGH_SECURITY mode (e.g., when the control parameter HIGH_SECURITY$_{EN}$ is set to ENABLED). In one example implementation, a HMAC-SHA-256 function may be used to generate the keys. The key generation function may, for example, utilize a lower iteration count when the HIGH SECURITY mode is disabled than when the HIGH SECURITY mode is enabled. Thus, even if an NN 118 has the correct password, it will not generate the keys in the same manner as the network NC 110 if they are not operating in the same security mode (e.g., if either the NC 110 or the NN 118 is in HIGH SECURITY mode and the other is not). Therefore, when there is a mismatch in the security mode, the keys of the NN 118 will not match the keys used by the network 106 and the NN 118 will not be able to gain admission to the network 106.

Figure 7A:
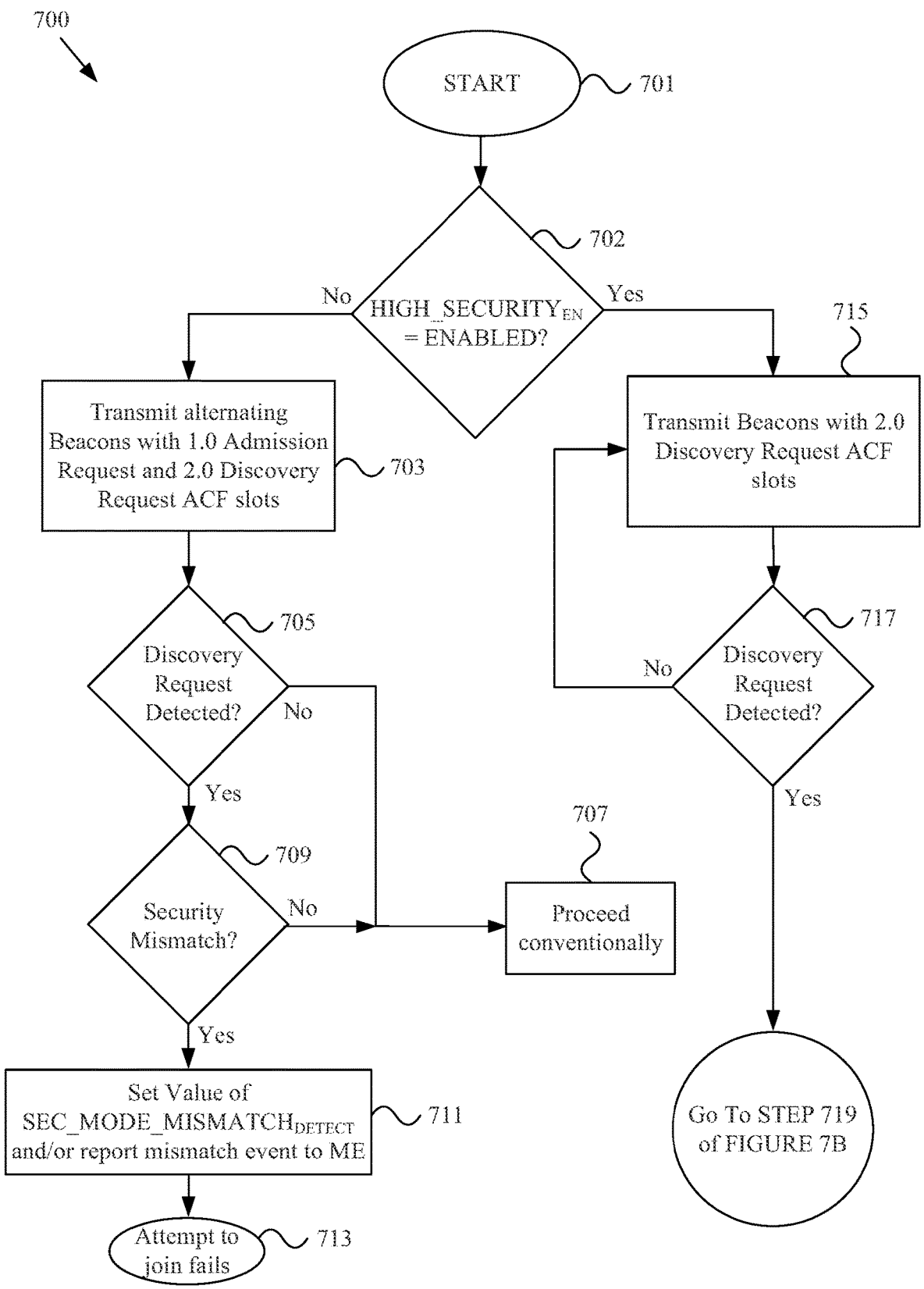
FIG. 7A is a flow diagram of an example method for operating a network node, for example a network coordinator node, in accordance with various aspects of the present disclosure.
Figure 7B:
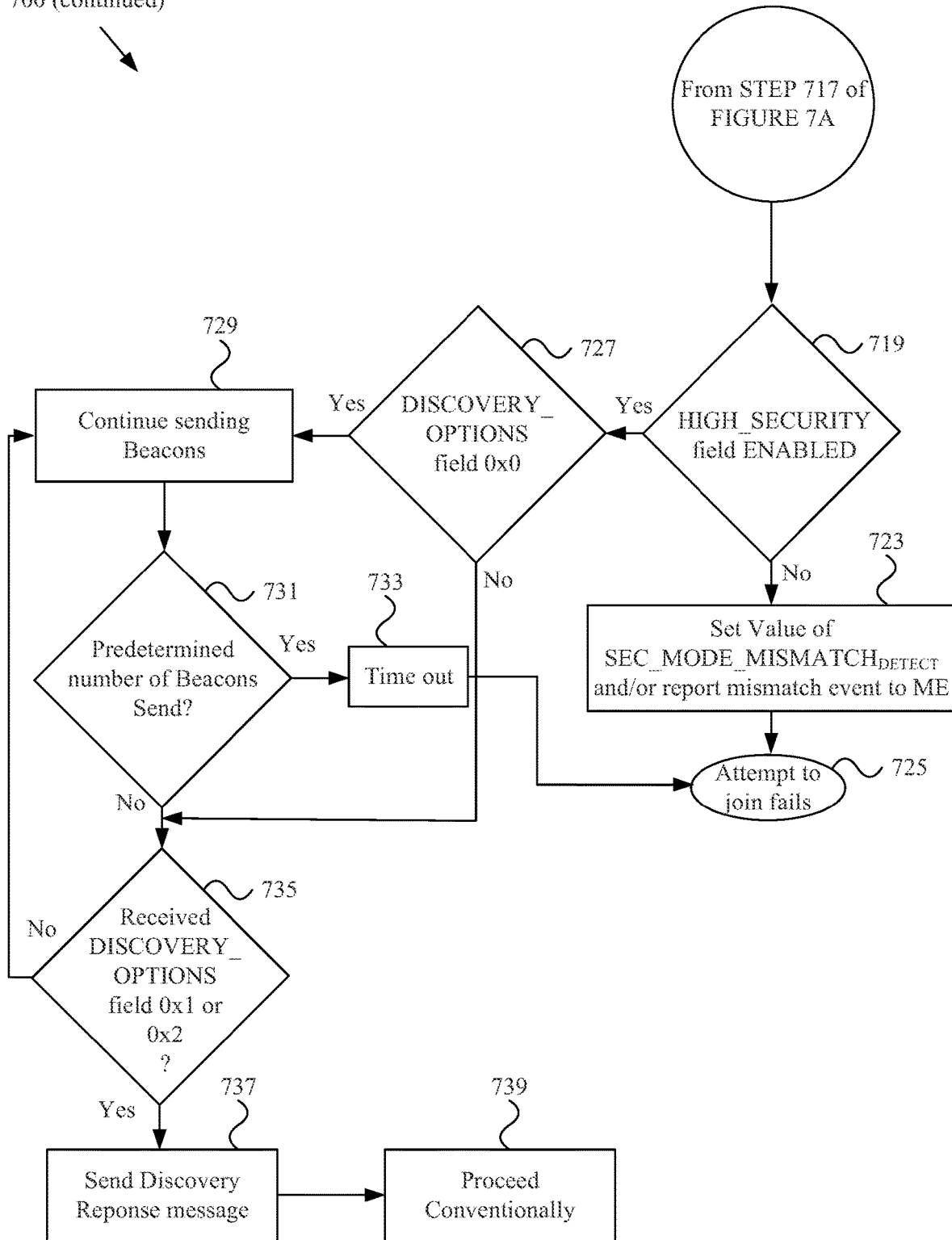
FIG. 7B is a continuation of the flow diagram of FIG. 7A.

FIG. 7 is a flow diagram of an example method 700 for operating a network node, for example a network coordinator node, in accordance with various aspects of the present disclosure. FIG. 7 is split into FIG. 7A and FIG. 7B. The example method 700 may, for example, be performed by any or all network nodes presented herein. For example, the example method 700 may be performed by a network coordinator (NC) node (or network controller) managing admission to a communication network. The discussion herein will proceed referring to the operation of NC node 110, shown in FIG. 1 (e.g., which may also be shown as the nodes 200 and 300 shown in FIGS. 3 and 4). The NC 110 may, for example, be operating in a HIGH SECURITY mode, in accordance with various aspects of the present disclosure. It should be understood, however, that the scope of the various aspects of the present disclosure is not limited to operation of a network coordinator node. Note, however in an example MoCA network, any node may generally perform the functionality of a network coordinator.

The example method 700 begins executing at block 701. The example method 700 may begin executing in response to any of a variety of causes or conditions. For example, the example method 700 may begin executing in response to receiving operation flow from another method or any block of the example method 700. Also for example, the example method 700 may begin execution in response to a hard reset of the NC 110, in response to a user request or command received at the NC 110, in response to a request or command from another node, in response to command by a management entity 224, etc.

At flow control block 702, it is determined whether the NC 110 is operating in HIGH SECURITY mode. If the NC 110 is not operating in HIGH_SECURITY mode (e.g., the control parameter HIGH_SECURITY$_{EN}$ of the NC 110 is set to DISABLED), then block 702 will direct execution flow of the example method 700 to block 703. If, however, the NC 110 is operating in HIGH SECURITY mode (e.g., the control parameter HIGH_SECURITY$_{EN}$ of the NC is set to ENABLED), then block 702 will direct execution flow of the example method 700 to block 715.

At block 703, the NC 110 will transmit Beacons. The Beacons will alternate between scheduling timeslots for admission control messages for earlier generation nodes and current generation nodes. In an example MoCA implementation, the NC 110 will alternative between transmitting Beacons that schedule an ACF slot for MoCA 1.0 Admission Requests to be sent by an NN, and transmitting Beacons that schedule an ACF slot for MoCA 2.0 Discovery Request messages to be sent by an NN.

At flow control block 705, the NC 110 determines whether a Discovery Request has been detected. If a Discovery Request has not been detected, then block 705 directs execution flow of the example method 700 to block 707, at which operation of the NC 110 will proceed in a normal fashion.

If, however, the NC 110 detects (or receives) a Discovery Request message, then block 705 directs execution flow of the example method 700 to block 709. At block 709, the NC 110 checks the value of the HIGH_SECURITY field of the Discovery Request message (e.g., as carried in the Discovery Request Network IE 508 of a Discovery Request message 500). In an example implementation, the NC 110 analyzes the HIGH_SECURITY field 518 to determine whether there is a security mode mismatch between the NN that sent the Discovery Request and the NC 110 (e.g., as evidenced by the NC's HIGH_SECURITY$_{EN}$ control parameter).

If, at block 709, the NC 110 determines that the value of the HIGH_SECURITY field is DISABLED, then there is no security mismatch. Execution flow of the example method 700 then proceeds to block 707, at which the admission process for the NN that sent the received Discovery Request message will continue in a normal fashion. Additionally, at this point, since the NC 110 is not operating in HIGH_SECURITY mode, admission operation will also proceed in a normal fashion in response to attempts by MoCA 1.X NNs to join the network.

If, however, at block 709, the NC 110 determines that the value of the HIGH_SECURITY field is ENABLED (e.g., set to 0b1), then there is a security mismatch. Execution flow of the example method 700 then proceeds to block 711, at which the NC 110 sets the value of the control parameter SEC_MODE_MISMATCH$_{DETECT}$ (see Table 1) to report that a security mode mismatch has occurred (e.g. reporting the mismatch to its management entity 214). Note that setting the control parameter SEC_MODE_MISMATCH$_{DETECT}$ may, for example, cause an event message (e.g., a SEC_MODE_MISMATCH$_{DETECT}$ event) to be communicated to the NC's Management Entity to notify the Management Entity of the detected mismatch. Also for example, such an event message may be communicated to the ME without setting a local control parameter. Flow of the example method 700 may then proceed to block 713, at which the attempt to join the network fails. For example, either no admission opportunity will be provided by the NC 110, the password held by the NN 118 will be different from the network password (e.g., the NN 118 will have a HIGH SECURITY mode password, and the NC 110 will have a normal password), or the process for generating the key will differ (e.g., the number of iterations used to in the key generation function will differ, as discussed herein).

Returning to flow control block 702, if HIGH SECURITY mode is enabled for the NC 110, then execution of the example method 700 will flow to block 715, at which the NC 110 will transmit Beacons. At block 715, as opposed to block 703, the NC 110 will only transmit Beacons that schedule timeslots for admission control messages for current generation nodes. In an example MoCA 2.0 implementation, the NC 110 will only transmit Beacons that schedule ACF slots for MoCA 2.0 Discovery Request messages. Execution flow of the example method 700 with then proceed to flow control block 717.

At flow control block 717, the NC 110 determines whether a Discovery Request has been detected. If a Discovery Request has not been detected, then block 717 directs execution flow of the example method 700 to block 715, at which the NC 110 will continue to transmit Beacons. If, however, the NC 110 detects (or receives) a Discovery Request message, then block 717 directs execution flow of the example method 700 to block 719 (see FIG. 7B).

Referring now to FIG. 7B, at block 719, the NC 110 checks the value of the HIGH_SECURITY field of the Discovery Request message (e.g., as carried in the Discovery Request Network IE 508 of a Discovery Request message 500). In an example implementation, the NC 110 analyzes the HIGH_SECURITY field 518 to determine whether there is a security mode mismatch between the NN that sent the Discovery Request and the NC 110 (e.g., as evidenced by the NC's HIGH_SECURITY$_{EN}$ control parameter).

If the value of the HIGH_SECURITY field is not ENABLED, then there is a security mismatch, since the NC 110 at this point is operating in the HIGH SECURITY mode. Execution flow of the example method 700 then proceeds to block 723, at which the NC 110 sets the value of the control parameter SEC_MODE_MISMATCH$_{DETECT}$ (see Table 1) (e.g., to report the mismatch to its management entity 214). Note that setting the control parameter SEC_MODE_MISMATCH$_{DETECT}$ may, for example, cause an event message (e.g., a SEC_MODE_MISMATCH$_{DETECT}$ event) to be communicated to the NC's Management Entity to notify the Management Entity of the detected mismatch. Also for example, such an event message may be communicated to the ME without setting a local control parameter. Flow of the example method 700 may then proceed to block 725, at which the attempt by the NN to join the network fails.

If at block 719, the NC 110 determines that the value of the HIGH_SECURITY field 518 is ENABLED (e.g., set to 0b1), then execution flow of the example method 700 will flow to block 727. At block 727, the NC 110 will check the state of the DISCOVERY_OPTIONS field 520. If the DISCOVERY_OPTIONS field 520 is set to a value of 0x0 (zero hexadecimal), then execution flow of the example method 700 will flow to block 729, at which the NC 200 will continue sending a predetermined number of additional Beacons. As explained herein, such a value in the DISCOVERY OPTIONS field 520 may, for example, indicate that the NN needs time to generate security information. In accordance with one example implementation, the predetermined number of additional Beacons is 200.

After the NC 110 sends a Beacon at block 729, execution flow of the example method 700 proceeds to block 731, at which a determination is made whether the predetermined number of Beacons have been sent. If so, then block 731 directs execution flow of the example method 700 to block 733, at which point the admission process for the NN times out at block 733 and the NN's attempt to join the network fails at block 725. If not, then block 731 directs execution flow of the example method 700 to block 735 to determine whether a Discover Request message has been received with the DISCOVERY_OPTIONS field set to 0x1 or 0x2. If not, then block 735 directs execution flow of the example method back up to block 729 for continued transmission of the Beacons.

If block 735 determines that a Discovery Request message has been received with the DISCOVERY_OPTIONS field 520 set to either 0x1 or 0x2, then block 735 directs execution flow of the example method 700 to block 737. At block 737, the NC 110 forms and transmits a Discovery Response message. An example format for the Discovery Response message 600 is presented herein at FIG. 6, and the admission process will proceed in a normal fashion thereafter at block 739.

In summary, various aspects of this disclosure provide systems and methods for efficiently and securely forming a communication network. As a non-limiting example, various aspects of the present disclosure provide systems and methods, for example utilizing a plurality of different security modes, for forming a premises-based network (e.g., a MoCA network). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A network comprising:
   a first network node; and
   a network coordinator node, wherein:
   the first network node comprises at least one circuit operable to, at least:
   receive a first beacon from the network coordinator node, where the first beacon comprises first timing information that indicates when a discovery request message may be transmitted to the network coordinator node;
   analyze the first timing information in the received first beacon to determine when to transmit a first discovery request message to the network coordinator node; and
   transmit the first discovery request message to the network coordinator node, where the first discovery request message comprises:
   a first information field comprising security information; and
   a second information field comprising second information that indicates to the network
   coordinator node whether to wait for a second discovery request message from the first network node before transmitting a discovery response message to the first network node; and
   the network coordinator node comprises at least one circuit operable to, at least:
   transmit the first beacon;
   receive the first discovery request message from the first network node; determine based, at least in part, on the first information field and the second information field of the first discovery request message whether to wait for a second discovery request message from the first network node before transmitting a discovery response message to the first network node; and
   when it is determined to wait for a second discovery request message from the first network node before transmitting a discovery response message to the first network node:
   transmit at least a second beacon comprising second timing information that indicates when the first network node may transmit the second discovery request message; and
   refrain from transmitting the discovery response message to the first network node until after receiving the second discovery request message from the first network node;
   wherein the security information of the first discovery request message is based, at least in part, on whether privacy within the first network node is enabled; and the discovery response message comprises second security information that indicates whether privacy within the network coordinator node is enabled.

2. The network of claim 1, wherein the at least one circuit of the first network node is operable to, after operating to transmit the first discovery request message:
   receive the second beacon from the network coordinator node;

analyze the second timing information in the received second beacon to determine when to transmit the second discovery request message to the network coordinator node; and transmit the second discovery request message to the network coordinator node.

3. The network of claim 2, wherein the at least one circuit of the network coordinator node is operable to:

if it is determined to wait for the second discovery request message from the first network node before transmitting the discovery response message to the first network node:
after transmitting the second beacon, receive the second discovery request message from the first network node; and
send the discovery response message to the first network node in response to receiving the second discovery request message.

4. A network node comprising:

at least one circuit operable to, at least:

transmit a first beacon comprising first timing information, where the first timing information indicates when a node looking to gain admission to a network may transmit a discovery request message;

after transmitting the first beacon, receive a first discovery request message from a second node, the first discovery request message comprising:
a first information field comprising security information; and a second information field comprising second information;

determine based, at least in part, on the first information field and the second information field whether to wait for a second discovery request message from the second node before transmitting a discovery response message to the second node; and when it is determined to wait for a second discovery request message from the second node before transmitting a discovery response message to the second node:
transmit at least a second beacon comprising second timing information that indicates when the second node looking to gain admission to the network may transmit the second discovery request message; and
refrain from transmitting the discovery response message to the second node until after receiving the second discovery request message from the second node;

wherein the security information of the first discovery request message is based, at least in part, on whether privacy within the second node is enabled; and wherein the discovery response message comprises second security information that indicates whether privacy within the network node is enabled.

5. The network node of claim 4, wherein the at least one circuit is operable to, if the at least one circuit determines that the security information of the first discovery request message does not match a security control parameter maintained by the network node, then indicate to a management entity of the network node that a security mismatch has occurred.

6. The network node of claim 4, wherein the at least one circuit is operable to:
transmit a first type of beacon;
transmit a second type of beacon, different from the first type of beacon;
alternate transmitting at least the first and second types of beacons when operating in a first security mode; and
only transmit beacons of the first type when operating in a second security mode.

7. The network node of claim 4, wherein the at least one circuit is operable to:
if it is determined to wait for a second discovery request message from the second node before transmitting a discovery response message to the second node:
after transmitting the second beacon, receive the second discovery request message; and
send the discovery response message in response to receiving the second discovery request message.

8. The network node of claim 7, wherein the discovery response message comprises second security information that indicates a security mode in which the network node is operating.

9. The network node of claim 4, wherein the at least one circuit is operable to:
analyze the security information of the first discovery request message by, at least in part, comparing the security information of the first discovery request message to a security control parameter maintained by the network node; and
if it is determined that the security information of the first discovery request message does not match the security control parameter maintained by the network node, then refrain from joining the second node to the network.

10. A network node comprising:
at least one circuit operable to, at least:
receive a first beacon from a second node of a network, where the first beacon comprises first timing information that indicates when a discovery request message may be transmitted to the second node;
analyze the first timing information in the received first beacon to determine when to transmit a first discovery request message to the second node;
transmit the first discovery request message to the second node, where the first discovery request message comprises:
a first information field comprising security information; and
a second information field comprising second information that indicates to the second node whether to wait for a second discovery request message from the network node before transmitting a discovery response message to the network node,
wherein the at least one circuit is operable to, after operating to transmit the first discovery request message: receive a second beacon from the second node of the network, where the second beacon comprises second timing information that indicates when a discovery request message may be transmitted to the second node; analyze the second timing information in the received second beacon to determine when to transmit the second discovery request message to the second node; and transmit the second discovery request message to the second node,
wherein the discovery response message comprises second security information that indicates a security mode in which the second node is operating, and wherein the at least one circuit is operable to determine the security information of the first discovery request message based, at least in part, on whether privacy within the network node is enabled.

11. The network node of claim 10, wherein the at least one circuit is operable to, after operating to transmit the second discovery request message, receive the discovery response message from the second node.

12. The network node of claim 11, wherein the second security information that matches the security information of the first discovery request message.

13. The network node of claim 10, wherein the at least one circuit is operable to determine the second information of the first discovery request message by, at least in part, determining whether an additional amount of time is needed.

14. The network node of claim 13, wherein the additional amount of time is needed for processing.

\* \* \* \* \*